Feb. 3, 1931.   G. BERGLUND   1,791,397
SLEIGH
Filed Nov. 18, 1926
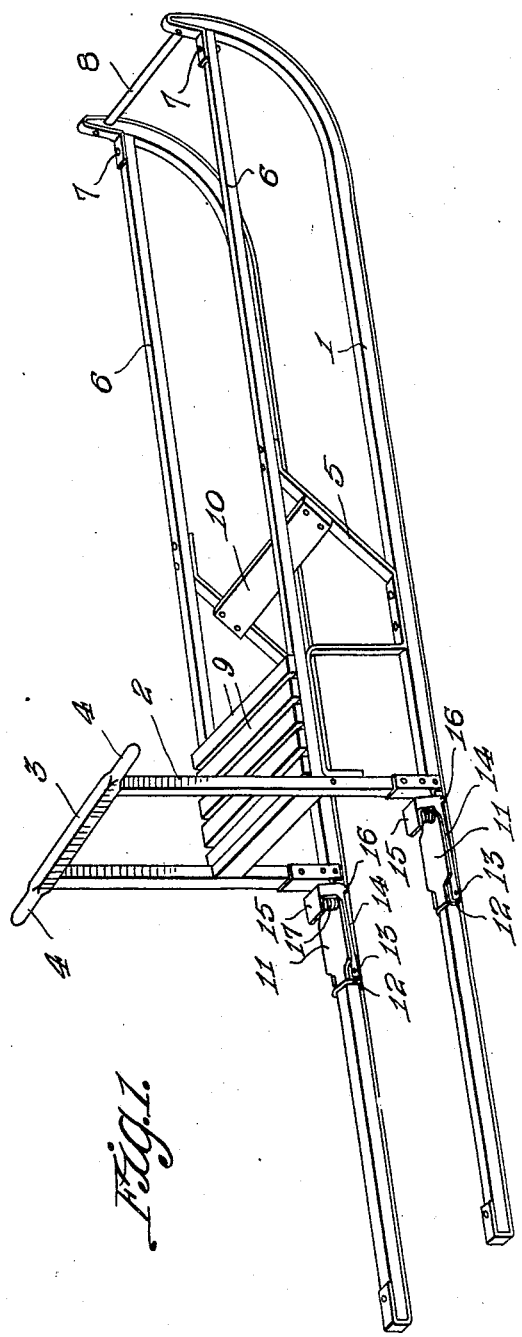
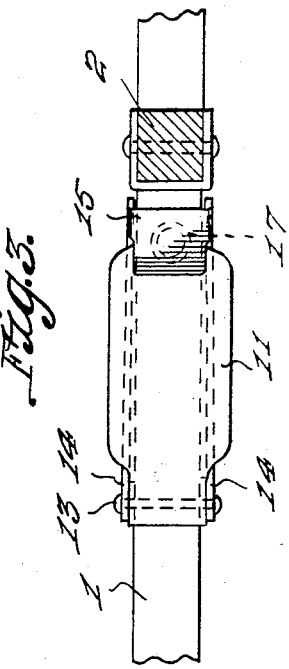
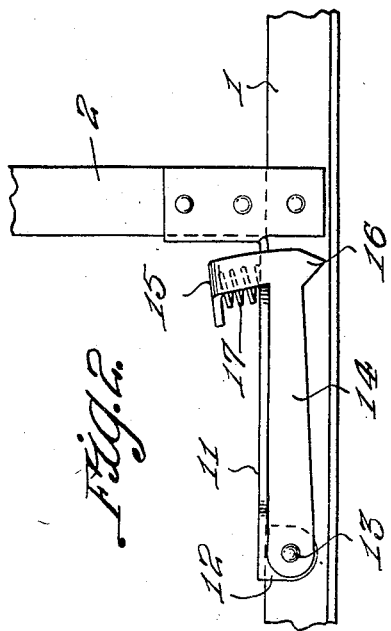
G. Berglund, INVENTOR
BY Victor J. Evans ATTORNEY
WITNESS:

Patented Feb. 3, 1931

1,791,397

UNITED STATES PATENT OFFICE

GUSTAVE BERGLUND, OF VALLEY STREAM, NEW YORK

SLEIGH

Application filed November 18, 1926. Serial No. 149,219.

This invention relates to new and useful improvements in sleighs and more particularly to a sleigh adapted to be propelled by one foot of the user and the main object of the invention is a provision of a sleigh of this character having new and improved means for applying a brake to the sleigh when so desired.

Another object of my invention is the provision of an improved brake for hand sleighs so positioned relative to the foot rest thereon as to be readily accessible to the operator for applying the brake when so desired.

With the above and other objects in view the invention consists in the novel features of construction, the combination and arrangement of parts hereinafter more fully set forth, pointed out in the claims and shown in the accompanying drawings, in which:—

Figure 1 is a perspective view of a sleigh constructed in accordance with my invention.

Figure 2 is a detail side elevation illustrating the brake mechanism, and

Figure 3 is a top plan view of the foot rest and brake pedal.

Referring now more particularly to the drawings, the numeral 1 indicates the runners of the sleigh having mounted thereon upright standards 2, which are connected by cross bar 3, the ends of said cross bar projecting beyond the sides of the uprights and formed with handles 4.

Suitable brace members 5 are provided, the upper ends of which extend along beneath the upper platform bars 6 and the forward ends of the bars 6 are connected to the runners as shown at 7 while the forward ends of the runners are connected by means of the usual connecting bar 8.

A platform is mounted on the bar 6 and comprises a plurality of slats 9 and arranged directly in front of the platform is a cross piece 10 connected to the upwardly inclined portions of the brace members 5 to form a foot piece for the party using the platform 9.

Suitable foot rests are provided which are in the shape of plates 11, each having one end formed with a reduced portion having downwardly projecting perforated ears 12 which are adapted to straddle the runners 1 and are connected thereto by means of the pivot bolts 13.

The improved braking mechanism includes a pair of arms 14 for each runner, one arranged upon each side of the runner, said arms being connected at their forward ends by means of the foot treadle 15 while the other ends are pivotally mounted upon the bolts 13. These arms are provided with downwardly projecting teeth 16 normally disposed above the lower surface of the runners and are retained in this position by means of the coil spring 17 which is positioned between the foot treadle 15 and the forward end of the plate 11. From this it will be apparent that a person riding on the sleigh with his feet on the plates 11 may readily apply the brake by pressing his toes on the treadle 15 causing the down-turned portions 16 to bite into the surface over which the sleigh is traveling.

From the above description it will be readily apparent that I have provided a simple and inexpensive sleigh wherein means is provided for applying a brake to a sleigh when so desired and the brake is in such position that it may be quickly and readily actuated by the foot of the operator without the operator changing his position with regard to the sleigh.

While I have shown and described the preferred embodiment of my invention it will be understood that various changes and alterations may be made for carrying out my invention in practice without departing from the spirit of the invention or the scope of the appended claim.

Having described the invention, what I claim is:—

A sleigh brake formed from a single piece of material and including a pair of opposed substantially L-shaped arms, the relatively long corresponding branches of which are pivotally mounted on the opposed sides of a runner and arranged normally parallel therewith, with the corresponding short branches projecting above the upper edge of the runner, a foot treadle connecting the said short branches, a coil spring interposed between the runner and the foot treadle and normally holding the brake device elevated, depending pointed projections formed at the point of juncture between the long and short branches of said member and normally spaced from the ground, and a foot engaging plate reposing upon the upper edge of the runner and substantially co-extensive in length with the length of said long branches of said arms, said plate having a reduced extremity, and depending apertured ears carried by the extremity snugly straddling the runner, and adapted to be secured thereto by the pivots for said arms.

In testimony whereof I affix my signature.

GUSTAVE BERGLUND.